United States Patent
Yamamoto

(10) Patent No.: US 7,962,025 B2
(45) Date of Patent: Jun. 14, 2011

(54) IMAGER WITH AUTO FOCUS FUNCTIONALITY

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/707,856

(22) Filed: Feb. 18, 2010

(65) Prior Publication Data

US 2010/0215352 A1 Aug. 26, 2010

(30) Foreign Application Priority Data

Feb. 20, 2009 (JP) ................................. 2009-037355

(51) Int. Cl.
*G03B 17/00* (2006.01)
(52) U.S. Cl. .......................................................... 396/55
(58) Field of Classification Search .................... 396/55; 348/208.12
See application file for complete search history.

(56) References Cited

U.S. PATENT DOCUMENTS

| | | | |
|---|---|---|---|
| 2006/0177208 A1* | 8/2006 | Ito et al. .......................... | 396/55 |
| 2006/0251410 A1* | 11/2006 | Trutna, Jr. ....................... | 396/55 |
| 2007/0196089 A1 | 8/2007 | Yamaguchi | |
| 2007/0196091 A1 | 8/2007 | Yamaguchi | |
| 2007/0215791 A1 | 9/2007 | Yamamoto | |
| 2008/0136924 A1* | 6/2008 | Washisu ..................... | 348/208.2 |

FOREIGN PATENT DOCUMENTS

JP 2006-343509 12/2006

* cited by examiner

*Primary Examiner* — W. B. Perkey
*Assistant Examiner* — Noam Reisner
(74) *Attorney, Agent, or Firm* — Greenblum & Bernstein, P.L.C.

(57) ABSTRACT

An imager comprising is provided having an image-capturing device, a display, and a view angle controller. The first in-focus detector is movable with respect to a stationary platform, and detects whether a subject image is in focus of an image sensor. The shake detector detects a shake transmitted to the first in-focus detector. The first driver repositions the first in-focus detector with respect to the stationary platform according to a shake detected by the shake detector. The first in-focus detector provided on an in-focus light path is different from a photographing light path on which light is directed to the image sensor, and detects whether a subject image is in focus using incoming light along the in-focus light path.

17 Claims, 6 Drawing Sheets

IMAGER WITH AUTO FOCUS FUNCTIONALITY

BACKGROUND OF THE INVENTION

1. Field of the Invention

The present invention relates to an imager having an auto focus function.

2. Description of the Related Art

An imager, for example a digital camera, may comprise an auto focus function. The auto focus function virtually provides a distance measuring area on an imaging area of an imaging sensor, and automatically brings a subject into focus by using a subject image that is incident on the imaging area. Japanese Unexamined Patent Publication (KOKAI) No. 2006-343509 discloses that in the case that such camera has a shake reduction system, the shake reduction system performs so as to move the distance measuring area on the imaging area based on the amount of shaking a camera undergoes while the auto focus function is in effect.

However, if a subject image is not incident on an imaging area, the effect that an imager experiences from shaking is not reduced during auto-focusing. This may make it impossible for a camera to automatically maintain a subject image in focus on an imaging sensor.

SUMMARY OF THE INVENTION

An object of the present invention is to provide an imager that can maintain a subject image in focus on an imaging sensor, even if an imager is shaking.

An imager comprising is provided having an image-capturing device, a display, and a view angle controller. The first in-focus detector is movable with respect to a stationary platform, and detects whether a subject image is in focus of an image sensor. The shake detector detects a shake transmitted to the first in-focus detector. The first driver repositions the first in-focus detector with respect to the stationary platform according to a shake detected by the shake detector. The first in-focus detector provided on an in-focus light path is different from a photographing light path on which light is directed to the image sensor, and detects whether a subject image is in focus using incoming light along the in-focus light path.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

An embodiment of a digital camera as an imager according to the present invention is described below with reference to the accompanying figures.

Figure 1:
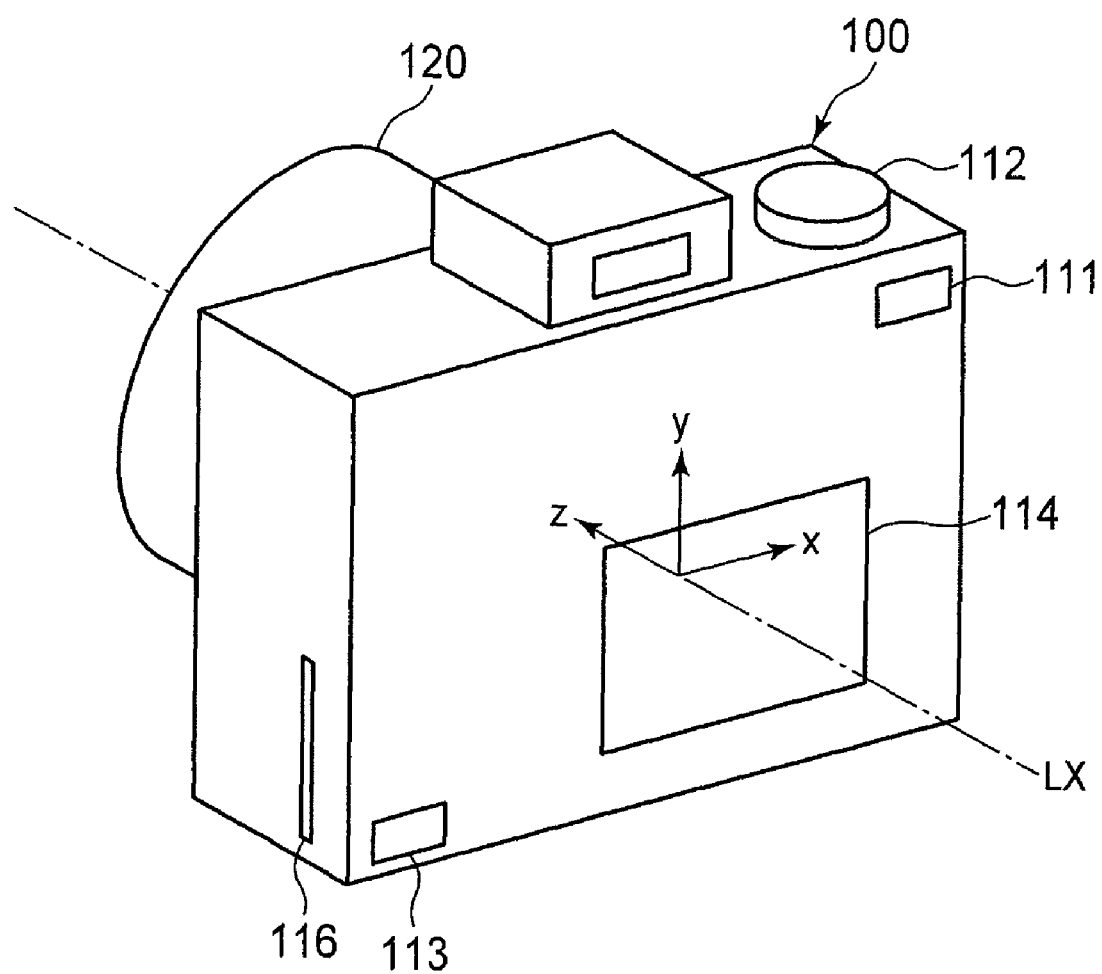
FIG. 1 is a perspective view of a rear surface of an imager according to the first embodiment of the present invention.
Figure 2:
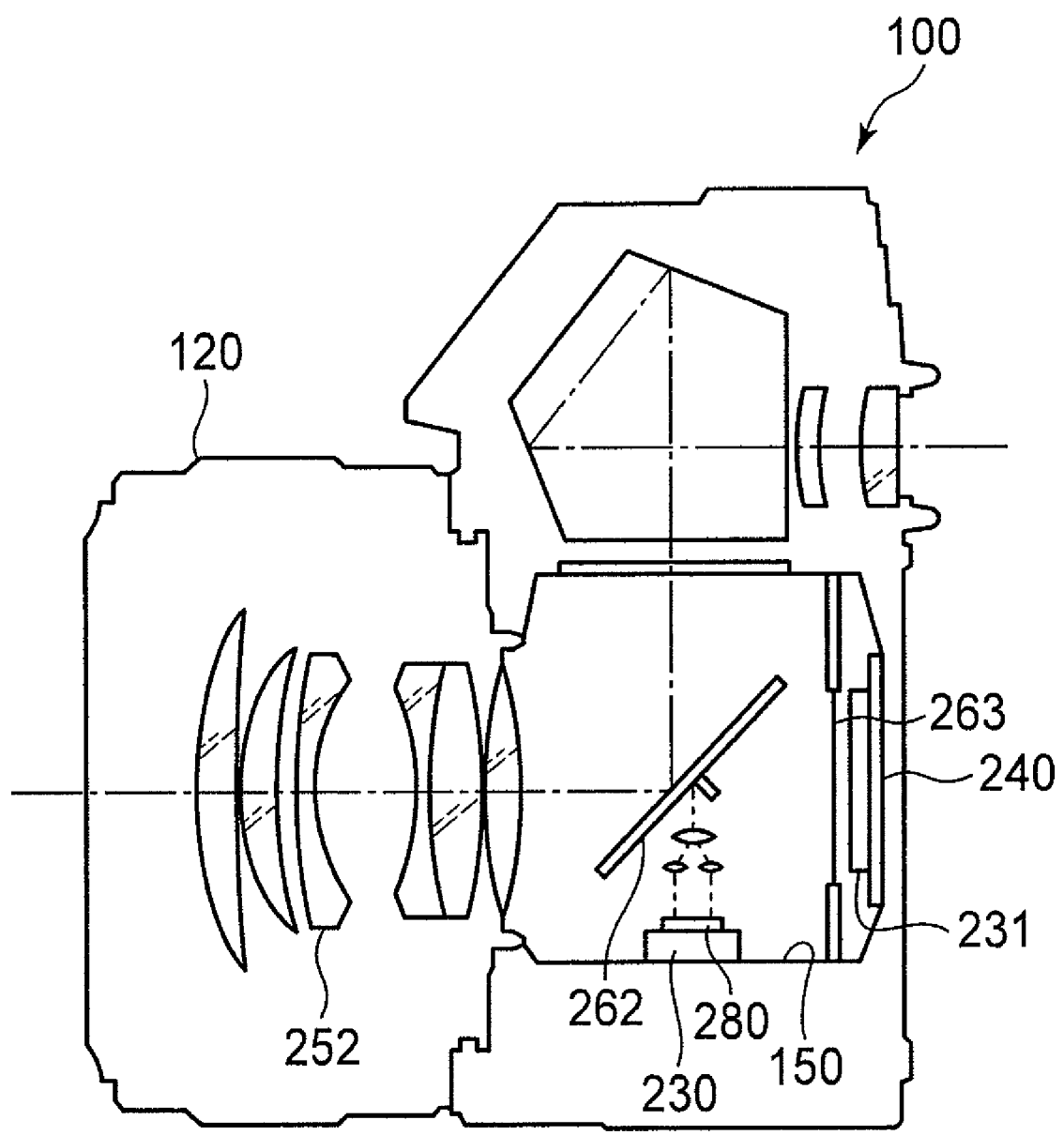
FIG. 2 is a cross-sectional view of an imager.
Figure 3:
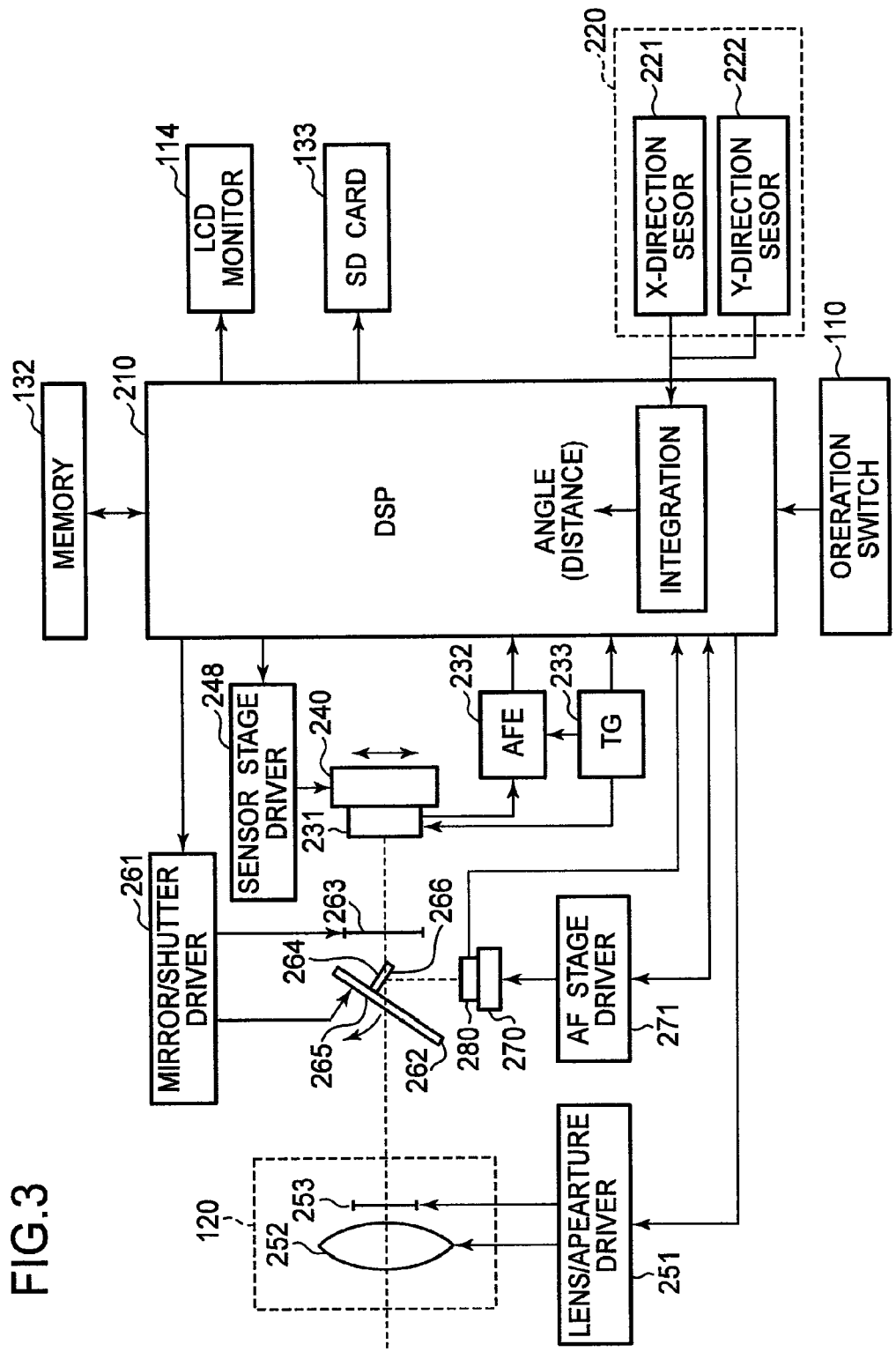
FIG. 3 is a block diagram of an imager.

The construction of a digital camera 100 according to the first embodiment is described with reference to FIGS. 1 to 3.

An SWM button 111 that switches power of the digital camera 100 on and off, a shutter release button 112, a shake reduction button 113, a LCD monitor 114, and a photographing lens 120 are provided on the digital camera 100.

The operation switch 110 comprises the SWM button 111, the shutter release button 112, and the shake reduction button 113.

The SWM button 111 is a momentary switch that projects from the rear surface of the digital camera 100. When a user depresses the SWM button 111, the main power of the digital camera is activated. When a user depresses the SWM button 111 while the main power of the digital camera is on, the main power of the digital camera is deactivated.

The shutter release button 112 is a two-step momentary switch, and is provided on the top of the digital camera 100. When a user depresses the shutter release button 112 halfway, a photometry operation, a distance surveying operation, and an in-focus operation are performed. Otherwise, a user fully depresses the shutter release button 112 and an imaging operation is performed.

The shake reduction button 113 is a momentary switch that projects from the rear surface of the digital camera 100. When a user depresses the shake reduction button 113, the digital camera is set to a shake reduction mode. The shake reduction mode executes a shake reduction process that prevents blurring of a subject in a photographed image caused by movement of the digital camera 100 during exposure, and is described later. In the case that a user depresses the shake reduction button 113 when the digital camera 100 is in the shake reduction mode, the digital camera 100 is released from the shake reduction mode.

The LCD monitor 114 is rectangular with an aspect ratio of three to four, which is the same as the aspect ratio of a photographed image. As illustrated in FIG. 1, the LCD monitor 114 is provided in the substantially central area of the rear surface of the digital camera 100 such that its longitudinal direction extends along the lateral direction of the digital camera 100. A through image captured by the imaging sensor 231, a photographed image, and various configuration data of the digital camera may be displayed on the LCD monitor 114.

The photographing lens 120 has a focusing lens 252 and an aperture diaphragm 253, and projects from the front surface of the digital camera 100.

Hereinafter, an X axis is defined as the axis that is orthogonal to the optical axis LX, is parallel to the longitudinal direction of the LCD monitor 114, and is positive in the direction toward the right when looking at the rear of the digital camera 100 from the perspective of FIG. 1. A Y axis is defined as the axis that is orthogonal to the optical axis LX, is parallel to the width direction of the LCD monitor 114, and is positive in the direction toward the top of the digital camera 100 of FIG. 1. A Z axis is defined as the axis that is parallel to the optical axis LX, and is positive in the direction from the rear surface toward the front surface of the digital camera 100 of FIG. 1.

A DSP 210, a lens/aperture driver 251, an AF sensor 280, an AF stage driver 271, a return mirror 262, a shutter curtain 263, a mirror/shutter driver 261, an image sensor 231, and a sensor stage driver 248 are provided in the digital camera 100.

The DSP 210 calculates the distance of movement of the focusing lens 252 based on a measured distance that is provided by the AF sensor 280. The DSP 210 then sends a signal to the lens/aperture driver 251 based on the calculated distance of movement. The lens/aperture driver 251 moves the focusing lens 252 based on the received signal, and brings the photographing lens 120 into focus. Thereby, a subject image is in focus of the image sensor 231 provided in the digital camera 100.

The DSP 210 measures an amount of light that is reflected from a subject image passing through the photographing lens 120 when the release button 112 is depressed halfway. The DSP 210 calculates light exposure based on the measured amount of light, and calculates an aperture value and exposure time based on the measured amount of light. The aperture value and the exposure time are used for photographing. After that, the DSP 210 sends the calculated aperture value to the lens/aperture driver 251, and the exposure time to the mirror/shutter driver 261.

The lens/aperture driver 251 is connected to the aperture diaphragm 253. When the release button 112 is fully depressed, the lens/aperture driver 251 controls the aperture of the aperture diaphragm 253 based on the aperture value sent from the DSP 210.

The mirror/shutter driver 261 is connected to the shutter curtain 263. When the release button 112 is fully depressed, the mirror/shutter driver 261 controls the speed of the shutter curtain 263 based on the exposure time sent from the DSP 210.

The return mirror 262 is connected to the mirror/shutter driver 261. When the release button 112 is fully depressed, the DSP 210 sends a mirror-up signal to the mirror/shutter driver 261. The mirror/shutter driver 261 raises the return mirror 262 based on the mirror-up signal. Thereby, the return mirror 262 is raised until the sweeping of the shutter curtain 263 is completed, so that a subject image is incident on the image sensor 231

The DSP 210 receives a digital image signal, processes it and then generates image data. After that, the DSP 210 stores the image data in the SD card 133, and displays it on the LCD monitor 114. The memory 312 is used as a working memory that temporarily stores data while the DSP 210 processes these calculations and conducts image processing.

The SD card 133 is detachably inserted into a card slot 116 that is provided on the side of the digital camera 100. A user can easily replace the SD card 133 by accessing the SD card 133 from the outside of the digital camera 100.

The shake reduction system is described hereinafter. The shake reduction system comprises an angular velocity sensor 220 that measures the angular velocity of the digital camera 100 (i.e., it measures a shock that the digital camera 100 receives), the image sensor 231 that converts a subject image to analog image signal, a shake correction component 240 that moves the image sensor 231, and the DSP 210 that controls the digital camera 100.

The angular velocity sensor 220 comprises an x-direction sensor 221 and a y-direction sensor 222 that are gyro sensors. The x-direction sensor 221 measures the angular velocity of the digital camera 100 in the x-direction. The x-direction angular velocity is the angular velocity in the direction parallel to the X axis, i.e. yawing motion that produces an angular velocity around the Y axis. The y-direction sensor 222 measures the angular velocity of the digital camera 100 in the y-direction. The y-direction angular velocity is the angular velocity in the direction parallel to the Y axis, i.e. a pitching motion that produces an angular velocity around the X axis. An output signal produced by the x-direction sensor 221 that indicates the x-direction angular velocity, and an output signal produced by the y-direction sensor 222 that indicates the y-direction angular velocity are input to the DSP 210.

The imaging sensor 231 is connected to the DSP 210 through an AFE (analog front end) 232 and a TG (timing generator) 233. The imaging sensor 231 comprises a CCD or a CMOS image sensor, has an imaging surface on which the photographing lens 120 provides a subject image, and is provided in the digital camera 100 so that the optical axis LX passes through the center of the imaging sensor 231. The TG 233 sends timing pulses to the imaging sensor 231 and the AFE 232 based on a signal from the DSP 210. The imaging sensor 231 outputs an analog image signal, which is created based on a subject image provided on the imaging surface, according to the timing pulses from the TG 233. The AFE 232 converts the analog image signal to a digital image signal based on the timing pulses from the TG 233, according to instructions from the DSP 210. After that, the digital image signal is sent to the DSP 210.

The imaging sensor 231 has an imaging area 234 that is used for imaging. A subject image passing through the imaging lens 120 is made incident on the imaging area 234.

Figure 4:
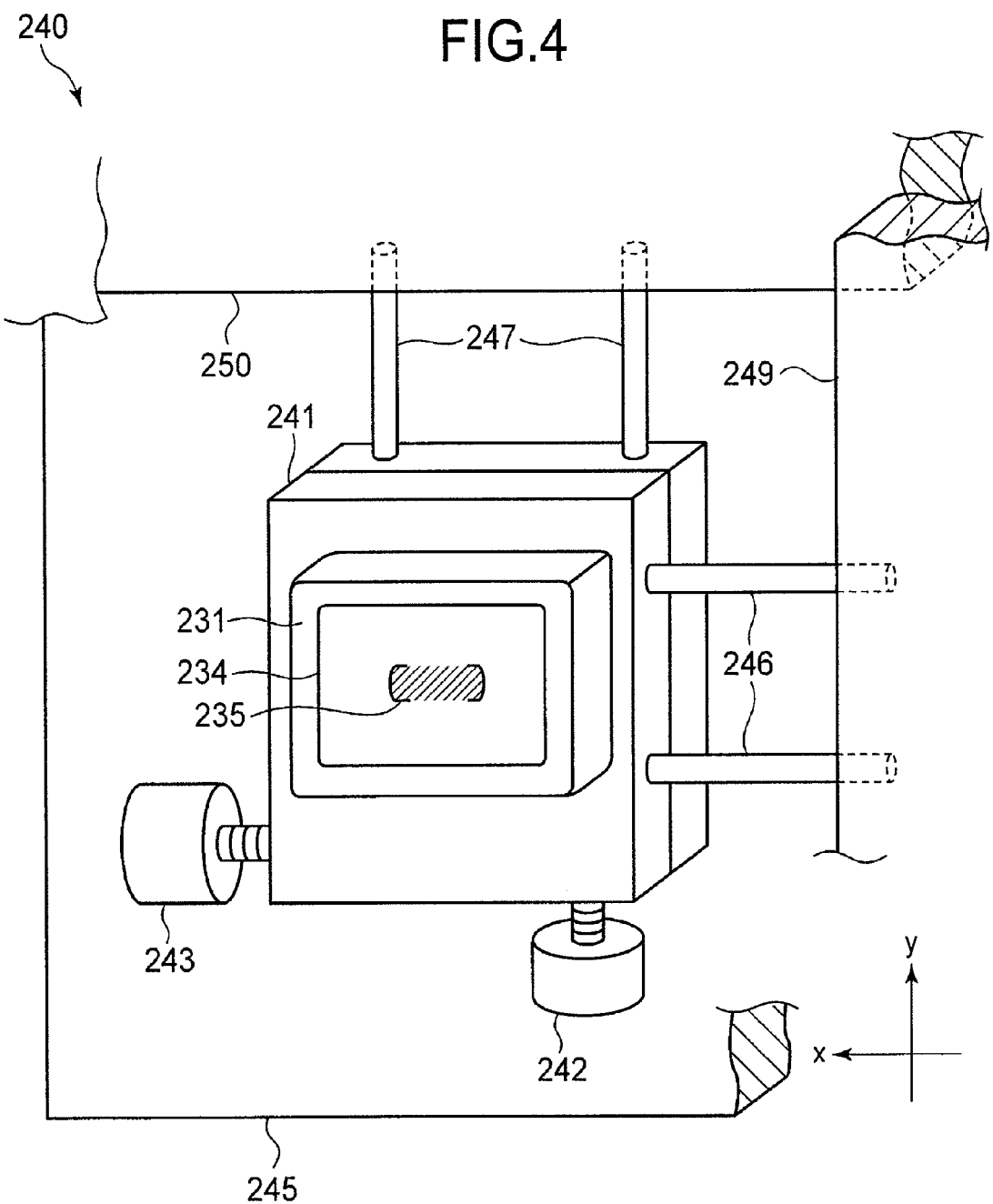
FIG. 4 is a perspective view of an image shake-reduction component.
Figure 5:
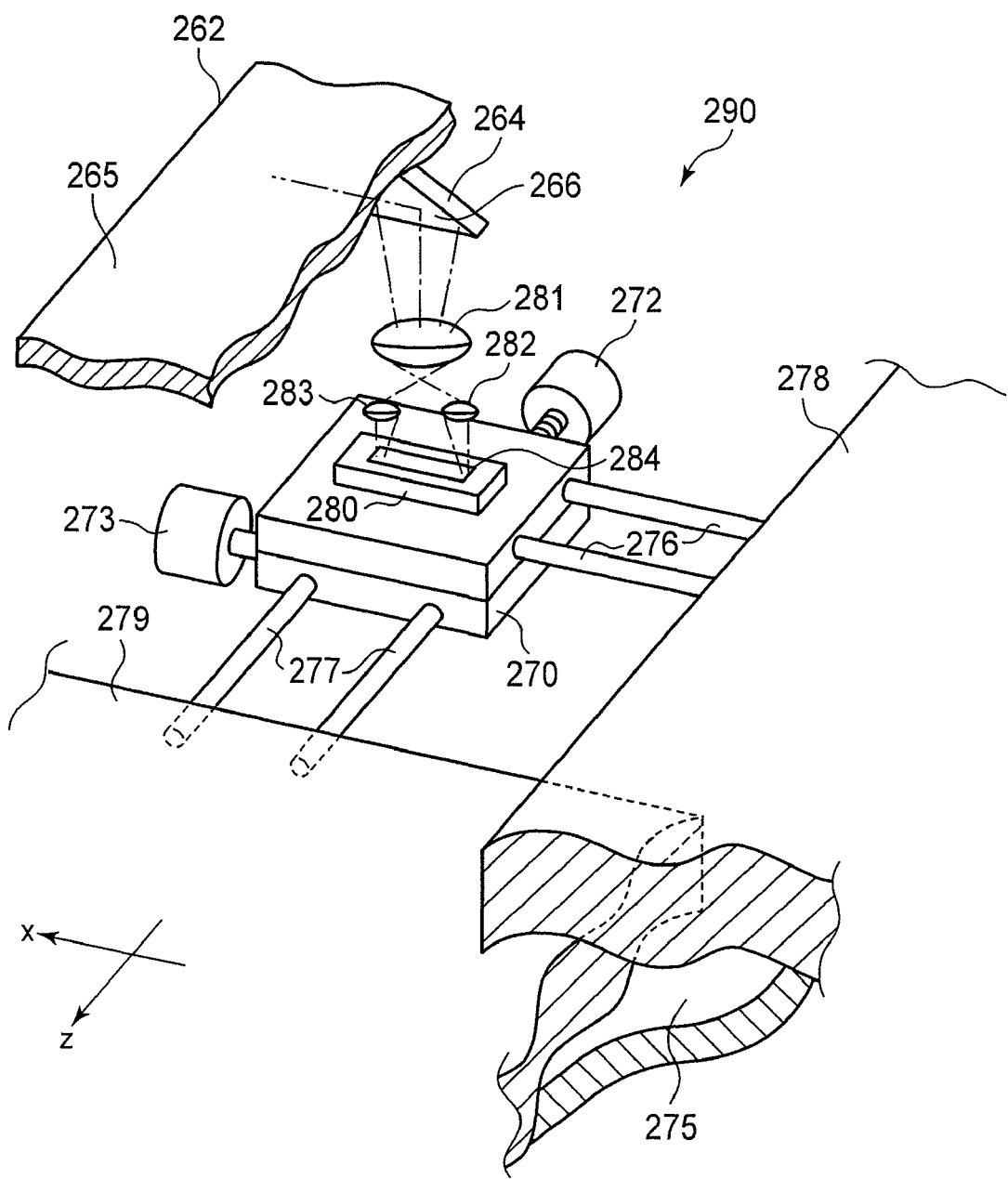
FIG. 5 is a perspective view of an AF sensor shake-reduction component.

The DSP 210 creates a virtual AF area 235 at the center of the imaging area 234. The AF area 235 is rectangular and located at the center of the imaging area 234 in the vertical direction of the digital camera 100, while extending in the horizontal direction, i.e., in the lengthwise direction of the imaging sensor 231. The center of the imaging area 234 and the center of the AF area 235 overlap one another (FIG. 4). The DSP 210 executes a contrast AF process so that the focusing lens 252 is moved into the in-focus position.

The shake correction device 240 comprises a movable part 241 that is driven based on movement of the digital camera 100, and a stationary platform 245 that is fixed with respect to the digital camera 100. The shake correction device 240 is connected to the DSP 210 through a sensor stage driver 248, which drives the movable part 241.

The image sensor 231 is connected to the movable part 241 so that the imaging surface is intersected by the path of light. The movable part 241 has two stepping motors: an x-direction motor 242 and a y-direction motor 243. The drive axes of the x-direction motor 242 and y-direction motor 243 are respectively connected to the movable part 241, so that the movable part 241 is driven in the X and Y directions. The x-direction motor 242 and the y-direction motor 243 are both connected to the sensor stage driver 248 with a flexible cable.

An x-stage 250 is provided on the stationary platform 245 so as to be freely movable in the X direction. A y-stage 249 is provided on the x-stage 250 so as to be freely movable in the Y direction. Two cylindrical y-direction guide rods 247, which extend in the Y direction, are connected to the x-x-stage 250. Two cylindrical x-direction guide rods 246, which extend in the X direction, are connected to the y-stage 249.

The movable part 241 comprises four guide holes that are aligned with the x-direction guide rods 246 and y-direction guide rods 247. Two guide holes extend along the X direction while maintaining a constant distance between each other in the Y direction. The other two guide holes extend along the Y direction while maintaining a constant distance between each other in the X direction. The x-direction guide rods 246 and the y-direction guide rods 247 are inserted into these guide holes. Thereby, the x-direction guide rods 246 and the y-direction guide rods 247 guide the movable part 241 so that it moves in the X and Y directions. The movable part 241 is freely movable in the X direction and the Y direction by the workings of the x-direction motor 242, y-direction motor 243, x-direction guide rods 246, and the y-direction guide rods 247.

The sensor stage driver 248 is connected to the DSP 210, and applies voltage to the x-direction motor 242 and the y-direction motor 243 based on a signal from the DSP 210.

Thereby, the movable part 241 changes its position with respect to the stationary platform 245 in the X direction and the Y direction.

The shake reduction operation of the imaging sensor 231 is carried out with these parts as described hereinafter. When the digital camera 100 moves, the x-direction sensor 221 and the y-direction sensor 222 measure angular velocities of the digital camera 100 in the X and Y directions. Then, the x-direction and y-direction angular velocities are input to the DSP 210. The DSP 210 calculates an x-direction shake angle and a y-direction shake angle based on the x-direction angular velocity and the y-direction angular velocity. Then, it calculates an x-direction coordinate and a y-direction coordinate of the position of the movable part 241 based on the x-direction shake angle and the y-direction shake angle. The x-direction coordinate is the position to which the movable part 241 should be moved in the X direction. The y-direction coordinate is the position to which the movable part 241 should be moved in the Y direction. In this calculation, the focusing length of the photographing lens 120 etc., are considered. Then, the calculated x-direction position coordinate and y-direction position coordinate are sent to the sensor stage driver 248. The sensor stage driver 248 calculates a voltage that to be applied to the x-direction motor 242 and the y-direction motor 243 based on the x-direction position coordinate and the y-direction position coordinate, and applies the calculated voltage to the x-direction motor 242 and the y-direction motor 243. Thereby, the movable part 241 repositions itself with respect to the stationary platform 245 in the X direction and the Y direction so that the movement of the digital camera 100 is cancelled out. By repeating these processes every one millisecond, the unwanted effect of shaking on the imaging sensor 231 is reduced. Note that shake reduction processing is carried out for the imaging sensor 231 is when the digital camera 100 photographs a subject.

Components that are used in the process of bringing a subject image into focus on the imaging sensor 231 are described hereinafter.

The DSP 210 is connected to the lens/aperture driver 251 that controls the focusing lens 252 and the aperture diaphragm 253, the mirror/shutter driver 261 that controls the return mirror 262 and the shutter curtain 263, the AF sensor 280 that detects focusing of the photographing lens 120, and the AF stage driver 271 that drives the AF stage 270 based on the movement of the digital camera 100.

The return mirror 262, the shutter curtain 263, and the AF sensor 280 are provided in a mirror box 150 of the digital camera 100.

The return mirror 262 includes a transparent part at the center of its light-receiving surface 265. The transparent part is a half mirror that transmits a portion of light incident on the center of the light-receiving surface 265 to the backside of the light-receiving surface 265. An auxiliary mirror 264 is provided on the backside of the light-receiving surface 265. The auxiliary mirror 264 comprises a reflecting surface 266 that forms an angle of 90 degrees with the receiving light surface 265, so that it reflects light. The light reflected by the auxiliary mirror 264 illuminates the AF sensor 280 as it passes through a condenser lens 182, a first separator lens 282, and a second separator lens 283.

An AF sensor shake reduction device 290 comprises the AF stage 270, an AF stationary platform 275 that is fixed inside the digital camera 100, an x-stage 279, and a z-stage 278. The AF sensor shake reduction device 290 is connected to the DSP 210 through an AF stage driver 271 that drives the AF stage 270.

The AF sensor 280 has a line sensor, and is provided on the bottom of the mirror box 150 so that the line sensor is exposed to the mirror box 150. The condenser lens 182 directs subject images which respectively pass through different parts of the photographing lens 120, to the first separator lens 282 and the second separator lens 283. The subject images are made incident on the line sensor by the first separator lens 282 and the second separator lens 283. Thereby, two subject images are made incident on the line sensor. The AF sensor 280 sends the positions of the two subject images incident on the line sensor to the DSP 210. The DSP 210 determines whether the focusing lens 252 is in the in-focus position when the distance between the two subject images incident on the line sensor is a predetermined distance. If the distance between the two subject images is less than the predetermined value, the focusing lens 252 focuses on the front of a subject (front focus). However, if the distance between the two subject images is greater than the predetermined value, the focusing lens 252 focuses on the rear of a subject (rear focus). Therefore, the DSP 210 calculates the distance of movement of the focusing lens 252 according to the distance between two subject images.

The AF sensor 280 is provided on the top surface of the AF stage 270 which is a rectangular solid. The AF stage 270 has two stepping motors, an x-direction stage motor 272 and a z-direction stage motor 273. The drive axes of the x-direction stage motor 272 and the z-direction stage motor 273 are respectively connected to the side of the AF stage 270, so that the motors drive the AF stage 270 in the X and Z directions. The x-direction stage motor 272 and the z-direction stage motor 273 are connected to the AF stage driver 271 through a flexible cable.

An x-stage 279 is provided on the AF stationary platform 275 so as to be freely movable in the X direction. A z-stage 278 is provided on the X stage 279 so as to be freely movable in the Z direction. Two cylindrical z-direction AF guide rods 277 that extend along the Z direction are connected to the x-stage 279. Two cylindrical x-direction AF guide rods 276 that extend along the X direction are connected to the z-stage 278.

The AF stage 270 comprises four guide holes so that it can slidably engage with the x-direction AF guide rods 276 and y-direction AF guide rods 277. Two guide holes extend along the X direction while maintaining a constant distance between each other in the Z direction. The other two guide holes extend along the Y direction while maintaining a constant distance between each other in the X direction. The x-direction AF guide rods 276 and the y-direction AF guide rods 277 are inserted into these guide holes. Thereby, the x-direction AF guide rods 276 and the y-direction AF guide rods 277 guide the AF stage 270 when it moves in the X and Z directions. The AF stage 270 is freely movable in the X direction and the Z direction by the workings of the x-direction stage motor 272, y-direction stage motor 273, x-direction AF guide 276, and the z-direction AF guide 277.

The AF stage driver 271 is connected to the DSP 210, and applies voltage to the x-direction stage motor 272 and the z-direction stage motor 273 based on a signal received from the DSP 210. Thereby, the AF stage 270 is repositioned with respect to the AF stationary platform 275 in the X and Z directions.

The shake reduction operation of the AF sensor 280 is carried out with these parts as described hereinafter. When the digital camera 100 moves, the DSP 210 receives the x-direction angular velocity and the y-direction angular velocity from the x-direction sensor 221 and the y-direction sensor 222. The plus and minus directions for the X axis of a subject image provided on the AF stage 270 correspond to the plus and minus directions of the X axis of the imaging sensor 231. The plus and minus directions for the Z axis of a subject image provided on the AF stage 270 correspond to the plus and minus directions of the Y axis of the imaging sensor 231. The DSP 210 calculates the x-direction coordinate and z-direction coordinate of the position of the AF stage 270 on the basis of the X-direction angular velocity and the Y-direction angular velocity, and sends the x-direction coordinate and z-direction coordinate of the position to the AF stage driver 271. The AF stage driver 271 calculates the voltages to be applied to the x-direction stage motor 272 and the z-direction stage motor 273 based on the x- and z-direction position coordinates, and then applies the voltages to the x-direction stage motor 272 and the z-direction stage motor 273. Thereby, the AF stage 270 is repositioned with respect to the AF stationary platform 275 in the X direction and the Z direction so that the movement of the digital camera 100 is cancelled out. By repeating these processes every one millisecond, the effects of shaking on the AF sensor 280 are reduced. Note that the shake reduction process for the AF sensor 280 is carried out when the photographing lens 120 focuses on a subject, i.e., before the digital camera 100 photographs a subject.

According to this embodiment, the digital camera 100 can focus on a subject in a stable manner even if the digital camera 100 is shaking.

Note that the shake reduction operation for the imaging sensor 231 may be carried out by the DSP 210 moving the AF area 235 relative to the imaging area 234. In this case, a contrast AF process that moves the focusing lens 252 to the position that provides the highest contrast with respect to the subject image incident on the imaging sensor 231 may be used. The x-direction angular velocity and the y-direction angular velocity caused by movement of the digital camera 100 are measured by the x-direction sensor 221 and the y-direction sensor 222. Then, the x-direction angular velocity and y-direction angular velocity are input to the DSP 210. The DSP 210 receiving the x-direction angular velocity and the y-direction angular velocity calculates the distance of movement for the AF area 235 based on the x- and y-direction angular velocities. Then, according to the calculated distance of movement, the DSP 210 moves the AF area 235 relative to the imaging area 234. The AF area 235 is moved relative to the imaging area 234 in the X and Y directions so that the effects of the digital camera 100 movements are cancelled out. Therefore, the contrast AF process can be carried out to mitigate the influence of shake on the digital camera 100.

The movable part 241 may comprise two driving coils, and a driving magnet may be provided on the stationary platform 245, so that the movable part 241 can be repositioned with respect to the stationary platform 245. In this case, an x-direction driving coil that drives the movable part 241 in the X direction, and a y-direction driving coil that drives the movable part 241 in the Y direction may be provided in the movable part 241. The x-direction driving coil and the y-direction driving coil are connected to the sensor stage driver 248 through a flexible cable. The stationary platform 245 has an x-direction driving magnet and y-direction driving magnet. The x-direction driving magnet is provided in a magnetic field that is generated by the x-direction driving coil. The y-direction driving magnet is provided in a magnetic field that is generated by the y-direction driving coil. The stationary platform 245 supports the movable part 241 so that it can move freely in the X and Y directions. The sensor stage driver 248 is connected to the DSP 210, and applies voltage to the x-direction driving coil and y-direction driving coil based on a signal received from the DSP 210. Thereby, the movable part 241 moves relative to the stationary platform 245.

Two driving coils may be provided in the AF stage 270 and a driving magnet may be provided on the AF stationary platform 275, so that the AF stage 270 can be repositioned relative to the stationary platform 245. In this case, an x-direction driving coil that drives the AF stage 270 in the X direction and a z-direction driving coil that drives the AF stage 270 in the Z direction may be provided in the AF stage 270. The x-direction driving coil and the z-direction driving coil are connected to the AF stage driver 271 through a flexible cable. The AF stationary platform 275 has an x-direction driving magnet and y-direction driving magnet. The x-direction driving magnet is provided in a magnetic field that is generated by the x-direction driving coil. The z-direction driving magnet is provided in a magnetic field that is generated by the z-direction driving coil. The AF stationary platform 275 supports the AF stage 270 so that it is freely movable in the X and Z directions. The AF stage driver 271 is connected to the DSP 210, and applies voltage to the x-direction driving coil and z-direction driving coil based on a signal received from the DSP 210. Thereby, the AF stage 270 moves relative to the AF stationary platform 275.

Figure 6:
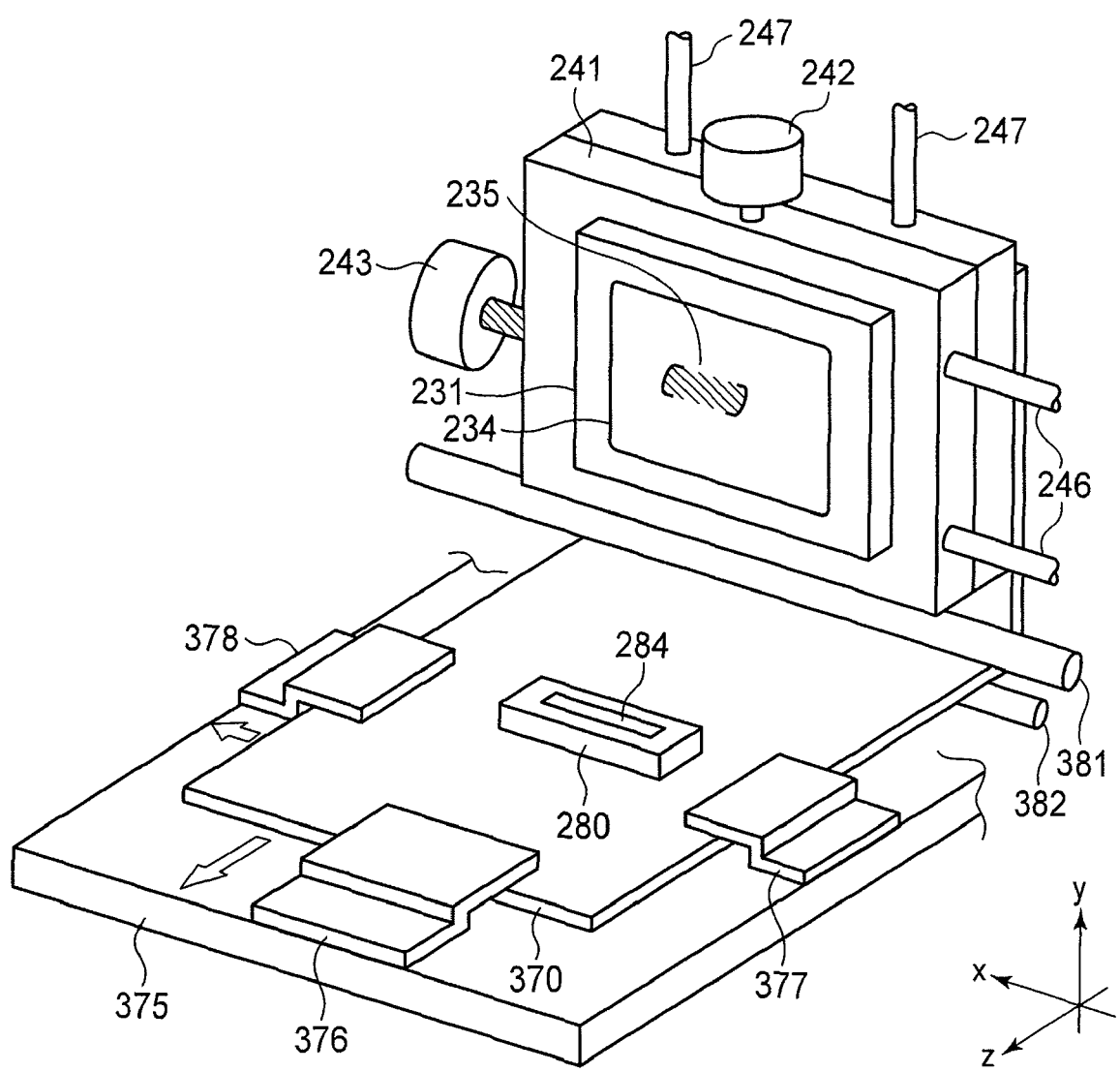
FIG. 6 is a perspective view of an image sensor etc., according to the second embodiment.

A second embodiment is described hereinafter with reference to FIG. 6. The constructions similar to those in the first embodiment are numbered the same and their explanations have been omitted.

In this embodiment, the AF sensor 280 and the imaging sensor 231 are provided on the sheet-shaped AF stage plate 370. The AF stage plate 370 forms a 90-degree angle from the bottom surface of the mirror box 150 to the side surface. The AF sensor 280 is provided on a part of the AF stage plate 370 located on the bottom surface of the mirror box 150. The imaging sensor 231 is provided on a part of the AF stage plate 370 that is located on the side surface of the mirror box 150. In the AF stage plate 370, a flexible part is provided between the part on which the imaging sensor 231 is provided and the part on which the AF sensor 280 is provided, i.e., at the angled part or crease of the AF stage plate 370.

An AF stage stationary platform 375 is provided on the bottom surface of the mirror box 150. The AF stage plate 370 is positioned on the top surface of the AF stage stationary platform 375, i.e., the surface facing the return mirror 262 so as to be able to slide with the AF stage stationary platform 375. A z-direction guide 376, a first x-direction guide 377, and a second x-direction guide 378 are provided on the top surface of the AF stage stationary platform 375 to restrict the movement of the AF stage plate 370 so that the movement of the AF stage plate 370 is restricted to a predetermined area. The z-direction guide 376, the first x-direction guide 377, and the second x-direction guide 378 have step-shaped cross-sections. One of their ends is fixed to the top of the AF stage stationary platform 375. Their other ends are positioned slightly away from the top surface of the AF stage stationary platform 375 so that they create a space that is slightly wider than the thickness of the AF stage plate 370. The AF stage plate 370 can slide between these other ends and the AF stage stationary platform 375.

The z-direction guide 376 prevents the AF stage plate 370 from moving away from the AF stage stationary platform 375, and restricts the movable area of the AF stage plate 370 in the Z direction.

The first x-direction guide 377 and the second x-direction guide 378 prevent that the AF stage plate 370 from moving away from the AF stage stationary platform 375, and restrict the movable area of the AF stage plate 370 in the X direction.

The angled part of the AF stage plate 370 is positioned between a first roller guide 381 and a second roller guide 384. The first roller guide 381 and the second roller guide 384 are rotatable around each axis according to the movement of the AF stage plate 370. A clearance that is slightly wider than the thickness of the AF stage plate 370 is provided between the first roller guide 381 and the second roller guide 384. The AF stage plate 370 can slide in the X direction with the first roller guide 381 and the second roller guide 384.

The center of the AF sensor 280 and the imaging sensor 231 is positioned on the surface that passes through the center of the AF stage plate 370 in the X direction.

When the x-direction motor 242 rotates in the positive direction, the movable part 241 moves along the X-axis in the positive direction. The AF stage plate 370 moves in the positive direction along the X axis with the movable part 241, because it is fixed to the movable part 241. Then, the AF sensor 280 provided on the AF stage plate 370 moves in the positive direction along the X axis. When the x-direction motor 242 rotates in the negative direction, the movable part 241 moves along the X axis in the negative direction, and the AF sensor 280 provided on the AF stage plate 370 moves in the negative direction along the X axis.

When the y-direction motor 243 rotates in the positive direction, the movable part 241 moves in the positive direction along the Y axis. The end of the AF stage plate 370 moves in the positive direction along the Y axis with the movable part 241, because the end of the AF stage plate 370 is fixed to the movable part 241. The angled part of the AF stage plate 370 rotates about the first roller guide 381 and the second roller guide 384 and moves towards the bottom side of the mirror box 150. The other end of the AF stage 270 that is near the bottom surface of the mirror box 150 moves along the Z axis in the positive direction. Thereby, the AF sensor 280 provided on the AF stage plate 370 moves along the Z axis in the positive direction. When the y-direction motor 243 rotates in the negative direction, the movable part 241 moves along the Y axis in the negative direction, and the AF sensor 280 provided on the AF stage plate 370 moves along the Z axis in the negative direction.

Due to the construction of the return mirror 262 and the auxiliary mirror 264, the reduction in shake of the imaging sensor 231 in the vertical direction is opposite to the direction of the reduction of shake of the AF sensor 280 in the vertical direction. However, because the shake reduction process for the AF sensor 280 is carried out when the photographing lens 120 focuses on a subject, i.e., before photographing, and the shake reduction process for the imaging sensor 231 is carried out when the digital camera 100 photographs a subject, these shake reduction processes are not carried out at the same time and therefore do not interrupt each other.

According to the embodiment, the effect of a shake is easily reduced without increasing the number of driving parts because the effect of the shake on the imaging sensor 231 and the AF sensor 280 is reduces by the same parts.

Note that the AF sensor 280 may be provided on the AF stage plate 370 so as to face in the same direction as the imaging sensor 231. In this case, the AF stage plate 370 is not angled and does not have elastic properties. A light reflected by the auxiliary mirror 264 is directed toward the AF sensor 280 by a third mirror. The direction of reducing the effect of shake on the imaging sensor 231 in the vertical direction is the same as the direction for reducing the effect of shake on the AF sensor 280 in the vertical direction.

The focusing lens 252 may not be moved to a focusing position based on a signal from the AF sensor 280, but the focusing position of the contrast AF process may be in such a position to provide the highest contrast with respect to a subject image incident on the imaging sensor 231. In this case, the effects of shake on the imaging sensor 231 or the AF area 235 may be reduced.

Moreover, the focusing position of the focusing lens 252 may be determined based on a signal from the AF sensor 280 and the imaging sensor 231. The effects of shake on the AF sensor 280, the imaging sensor 231 the AF area 235 are reduced. The focusing lens 252 is moved to a nearby focusing position based on a signal from the AF sensor 280, then, the focusing lens 252 is moved to a precise focusing position based on a signal from the imaging sensor 231 or the AF area 235.

The shake-detecting part may not be an angular velocity sensor 220, it may instead be a different device that can detect shake, e.g. an acceleration sensor.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2009-037355 (filed on Feb. 20, 2009), which is expressly incorporated herein, by reference, in its entirety.

The invention claimed is:

1. An imager comprising:
 a first in-focus detector that is movable with respect to a stationary platform, and detects whether a subject image is in focus of an image sensor;
 a shake detector that detects a shake transmitted to said first in-focus detector; and
 a first driver that repositions said first in-focus detector with respect to the stationary platform according to a shake detected by said shake detector;
 said first in-focus detector provided on an in-focus light path that is different from a photographing light path on which light is directed to the image sensor, and detects whether a subject image is in focus using incoming light along the in-focus light path.

2. The imager according to claim 1, wherein said first in-focus detector comprises first and second separator lenses that separate light passing along the in-focus light path, and a light detector that is illuminated by light passing through the first and second separator lenses, and the light detector determines whether a subject image is in focus on the image sensor on the basis of whether the distance between a position illuminated by light passing through the first separator lens and a position illuminated by light passing through the second separator lens is greater or less than a predetermined distance.

3. The imager according to claim 1, wherein the image sensor is movable with respect to the stationary platform, said shake detector detects a shake transmitted to the image sensor, and the imager further comprises a second driver that moves the image sensor relative to the stationary platform so as to cancel out the relative change in position of a subject caused by shaking detected by said shake detector.

4. The imager according to claim 3, wherein said second driver drives the image sensor in two directions on an imaging surface of the image sensor.

5. The imager according to claim 3, wherein the relative position of the image sensor with respect to an optical axis of the photographing light path is the same as the relative position of said first in-focus detector with respect to an optical axis of the in-focus light path, and the velocity of the image sensor moving toward the stationary platform is the same as the velocity of said first in-focus detector moving toward the stationary platform.

6. The imager according to claim 3, wherein said first driver is driven by said second driver.

7. The imager according to claim 6, wherein said first driver comprises a flexible plate that is driven by said second driver and a straight bar that changes the drive direction of the flexible plate by 90 degrees, the flexible plate has first and second regions and is driven by said second driver so as to reciprocate along the extending direction of the straight bar or along the orthogonal direction to the extended direction of the straight bar, said first in-focus detector is provided in the first region, and said second in-focus detector is provided in the second region.

8. The imager according to claim 6, further comprising a light direction changer that directs incoming light from an imaging optical system to either the photographing light path or the in-focus light path having the light axis parallel to the light axis of the photographing light path, said first driver comprises a plate driven by said second driver, and said in-focus detector and the imaging sensor are provided on the plate.

9. The imager according to claim 3, further comprising a second in-focus detector that detects whether a subject image is in focus on an image sensor using incoming light that is incident on the image sensor, and said second in-focus detector detects whether a subject image is in focus on an image sensor using a subject image in an in-focus detection area provided on the imaging surface of the image sensor.

10. The imager according to claim 1, further comprising a second in-focus detector that detects whether a subject image is in focus on an image sensor using incoming light that is incident on the image sensor.

11. The imager according to claim 10, wherein said second in-focus detector detects whether a subject image is in focus on an image sensor using a subject image in an in-focus detection area provided on the imaging surface of the image sensor.

12. The imager according to claim 11, wherein said shake detector detects a shake transmitted to the image sensor, and the imager further comprises a detection area changer that changes the position of the in-focus detecting area on the imaging surface so as to cancel out the relative change in position of a subject caused by the shake detected by said shake detector.

13. The imager according to claim 11, wherein the relative position of the in-focus detection area with respect to an optical axis of the photographing light path is the same as the relative position of said first in-focus detector with respect to an optical axis of the in-focus light path, and the velocity of the in-focus detection area moving on the imaging surface is the same as the velocity of the first in-focus detector moving toward the stationary platform.

14. The imager according to claim 1, further comprising a light direction changer that directs light from an imaging optical system onto either the photographing light path or the in-focus light path.

15. The imager according to claim 1, wherein said first driver drives said first in-focus detector in two directions on the surface that is orthogonal to the axis of the in-focus light path.

16. The imager according to claim 1, wherein said shake detector comprises an angular rate sensor.

17. The imager according to claim 1, wherein said shake detector detects a shake using a subject image incident on the imaging sensor.

* * * * *